Patented July 15, 1941

2,249,003

UNITED STATES PATENT OFFICE 2,249,003

PROTEIN COMPOSITION AND METHOD OF MAKING

Percy L. Julian, Maywood, and Elmer B. Oberg, Evanston, Ill., assignors to The Glidden Company, Cleveland, Ohio, a corporation of Ohio No Drawing. Application April 8, 1939
Serial No. 266,857

9 Claims. (Cl. 106—38)

The present invention relates to protein compositions and method of preparing the same, and more particularly relates to a protein-urea complex.

It is known that the inclusion of urea in a protein solution acts to retard gelling of the protein by formaldehyde. In general the customary manner in which the prior art incorporated the urea was by solution in the protein solution, either by addition thereto or simultaneously. Landecker for example, in United States Patent No. 1,725,805 proposes to grind the urea and casein for two hours before solution or he may add the casein to the urea solution. In Reissue No. 70,326 Christopher proposes to substitute biuret for urea.

An object of the present invention is to provide a process whereby the action of urea on protein is improved.

Another object of the present invention is to provide a new and novel process of treating protein with urea whereby new and improved results are obtained.

A further object of the invention is to produce a new and novel urea-protein composition.

A further object of the invention is to produce new and improved compositions employing the novel urea-protein complex.

Other objects and advantages of the invention will appear as the description of the invention proceeds.

It has been found that if the protein is dispersed in molten urea that the resulting product is completely soluble in water and that practically any amount of formaldehyde may be added to the solution without gelling of the protein at room temperature. Cloudiness will appear, however, when the pH reaches about 5 due to the precipitation of the protein as there is formic acid in the formaldehyde which has a pH of about 3.4. Addition of a small amount of alkali to raise the pH will remove the cloudiness.

The process comprises essentially melting the urea, and dispersing the protein in the molten urea. Urea melts at 133° C. and liberates $NH_3$ with the formation of biuret above this temperature. The protein in powdered form may be sifted in the molten urea with good agitation until it is thoroughly dispersed and wet by the molten urea. The temperature preferably does not exceed 150° C. If the heating is at a temperature of 150 to 170° C. a dark product is obtained which in solution is thin and soapy.

The molten mass may then be poured into trays or other suitable receptacles and allowed to cool, whereupon it sets to a hard mass which can be ground by ball milling. The resulting light colored powder can be dissolved in water to a thin, fairly transparent solution without added alkali and without heating, although either will hasten solutions. The viscous character of the protein solution ordinarily present is practically absent.

The ratio of urea to protein may vary. However, for best results and ease and economy of preparation the urea-protein ratio will ordinarily vary between 60/40 and 40/60, although the invention is by no means limited to such a range of proportions. If too large an amount of protein is used, the excess is difficult to disperse in the molten urea, and may remain unaffected by the reaction. A 50/50 mix has been found to give excellent results.

Accordingly 3 1000-gram batches were made employing ratios of urea to protein of 60/40, 50/50 and 40/60. The urea was melted, and the protein added gradually with stirring for 20 minutes, the temperature being kept between 135–145° C. The molten mass was cooled and ground in a ball mill. The protein used was an isolated soy bean protein. The 40/60 mix was difficult to stir, became very heavy, and balled up considerably. These preparations were warmed with water to aid solution, and all dissolved satisfactorily to give thin solutions. Ratios of water to urea-protein of 6:1, 3.5:1, 3:1 and 2.5:1 were used. 40% of formalin by weight of the urea-protein complex was then added. There was no gelling in any instance, even in the case of a water to urea protein ratio as low as 2.5:1. Even lower ratios as low as 1:1 may be prepared.

A comparison was then made between a fused urea-protein complex, a ball milled mixture of urea and protein and a ball milled mixture of biuret and protein. The following table shows the results of these comparisons and in which table the word protein refers to an isolated soy bean protein except where otherwise indicated. The ball milling was for 24 hours.

*Table I*

| | Examples | | | | | |
|---|---|---|---|---|---|---|
| | 1 | 2 | 3 | 4 | 5 | 6 |
| 50-50 fused urea-protein | 40 g. | | | | | |
| 50-50 urea-protein only ball milled | | 40 g. | | | | |
| 50-50 biuret-protein only ball milled | | | 40 g. | | | |
| 50-50 fused urea-casein | | | | 40 g. | | |
| Water | 100 cc. | 100 cc. | 100 cc. | 100 cc. | 100 cc. | 100 cc. |
| Borophosphate | | | | | 2 g. | 2 g. |
| Cut—warmed 20' at 140-160° F | Thin | Not cut | Not cut | Thin | Cut | Cut. |
| | O. K. | | | O. K. | Heavier than #1 | |
| pH | 6.3 | 4.3 | 4.4 | 6.7 | 7.8 | 7.85. |
| Formalin 20% of urea-protein | 8 cc. | 8 cc. | 8 cc. | 8 cc. | 8 cc. | 8 cc. |
| Gel | None | Very heavy | Very heavy | None | None | None. |

Overnight—no change in any except 5 and 6 which got heavier but did not gel.

Comparing cuts 1 to 4 it is observed that unless the protein is dispersed in the fused urea, the protein is not cut in water. Examples 5 and 6 show that while the product cut in alkali the cut was heavier than in Example 1 and also that while it did not gel upon the addition of 8% formalin it did thicken up and became heavier on standing.

Further comparisons between a fused urea-soy bean protein complex and a ball milled mixture of urea and the same soy bean protein were made as indicated in Table II.

*Table II*

| | 1 | 2 | 3 | 4 |
|---|---|---|---|---|
| 50-50 mix. ball milled | 40 g. | 40 g. | 40 g. | |
| 50-50 fused complex | | | | 40 g. |
| Borophosphate | 1.8 g. | 0.5 g. | 0.75 g. | 0.5 g. |
| Water | 120 cc. | 120 cc. | 120 cc. | 120 cc. |
| Nature of cut | Good | Not cut | Fair | Good. |
| pH of cut | 7.15 | | 5.72 | 7.2. |
| Pipet viscosity of cut | 46″ | | Too heavy | 45.5. |
| Formalin | 16 cc. | | 16 cc. | 16 cc. |
| Formalin added—viscosity | 49″ | | Heavier | 37″. |
| pH—formalin added | 6.35 | | 5.3 | 5.1. |

Comparing Examples 2 and 4 it is seen that with only 0.5 g. of borophosphate no solution of the ball milled mixture is obtained, whereas with the fused material excellent solution in water is obtained. Comparing Examples 1 and 4 it is found that in the case of the ball milled material more borophosphate is required to yield a water solution of the same pH and viscosity as the fused material. However, upon the addition of the formalin the viscosity in Example 1 went up and the pH dropped only relatively slightly, whereas in Example 4 the viscosity decreased, indicating that the effect of the added formalin was one of dilution, and the pH dropped to 5.1. In Example 3 the amount of borophosphate used was such as to give a pH value about the same as that in Example 4, after addition of the formaldehyde. The table shows that, at the same pH after addition of formaldehyde, the ball milled material is much heavier than the fused material. These comparisons clearly show a distinct difference between the two materials, and indicates that the fused product is a distinctly new and different material.

Since the concentrations in each case were the same the viscosity differences are not those caused by differences in concentration but are due to differences in structural viscosity or gelling. As to what happens, however, when the protein is heated with the urea is not clear. Undoubtedly the biuret reaction takes place between two molecules of urea and possibly between a molecule of urea and protein. This may account for the delaying of the action of formaldehyde. Also, if the urea acts as a solvent for the protein it may act to partially dissociate the protein molecule, and the reaction product of formaldehyde with the dissociated protein may not be the usual gel. Whatever the action, however, the prevention of gelling is greater when the protein is fused with the urea.

The fused urea-protein complex produced in accordance with the present invention may be used for many purposes. It is particularly useful in acqueous protein compositions in which it is desirable to incorporate formaldehyde, as the setting action of the formaldehyde is retarded in solution, but the formation of a water resistant product upon drying is not prevented. Thus it is possible to prepare protein-formaldehyde solutions which do not gel or gel so slowly that the composition can be satisfactorily used in coating, sizing or other operations. Heretofore it has been practically impossible to add formaldehyde directly to the protein solution due to gelling and thickening of the solution, and a two-step process in which the protein solution and formaldehyde are separately applied has been resorted to. This difficulty of the prior art procedure is overcome by the present invention.

The present invention is particularly useful in those applications in which heat is employed, as in the manufacture of plastics, coating and sizing of paper and textiles, etc. Upon the application of heat to the formaldehyde-treated complex, and the evaporation of water, a protein-urea-formaldehyde composite is formed, and this reaction may be used in the manufacture of plastics, coating and sizing operations, water paints, etc. When the complex is used for making plastics or similar products it may not be necessary to prepare a fluid solution containing the complex and formaldehyde. Various modifying ingredients may be incorporated in the final product.

Other materials may also be incorporated into the molten complex; for example, fusible or thermoplastic substances such as resins, molten at the temperature of the reaction, may be employed. For example, 500 grams of urea were melted and 250 grams of rosin and 500 grams of isolated soy bean protein stirred in. The cooled mass may then be dissolved in a suitable solvent preferably an organic water miscible solvent such as alcohol, and formaldehyde added as formalin without causing gelling. Paper dipped in this solution and dried by heating showed very good sizing.

It will be apparent that various changes and modifications may be made by those skilled in the art within the scope of the appended claims without departing from the spirit of the invention.

Having described the invention, what is claimed as new and desired to secure by Letters Patent of the United States is:

1. A process for treating protein comprising dispersing the protein in molten urea, and adding formaldehyde to the thus formed product.

2. A process for heating protein comprising dispersing the protein in molten urea at a temperature not exceeding 150° C, and adding formaldehyde to the thus formed product.

3. A process for treating soy bean protein comprising dispersing soy bean protein in molten urea, and adding formaldehyde to the thus formed product.

4. A composition of matter comprising water, formaldehyde, and the product obtained by dispersing protein in molten urea.

5. A composition of matter comprising water, formaldehyde and the product obtained by dispersing soybean protein in molten urea.

6. A plastic non-fluid composition of matter comprising water, formaldehyde and the product obtained by dispersing protein in molten urea.

7. A liquid non-gelling composition of matter comprising water, formaldehyde and the product obtained by dispersing protein in molten urea.

8. A non-gelling composition of matter comprising water, formaldehyde, and the product obtained by dispersing protein in molten urea in ratios between 60/40 and 40/60, the water to urea-protein ratio being as low as 1:1.

9. A non-gelling composition of matter comprising water, formaldehyde and the product obtained by dispersing protein in molten urea in ratios between 60/40 and 40/60, in which the formaldehyde is present in an amount up to not more than about 16% (40% of 37% formalin) of the urea protein, and the water to urea protein ratio is not less than about 1:2.5.

PERCY L. JULIAN.
ELMER B. OBERG.